United States Patent [19]

Ishizuka

[11] 4,414,246
[45] Nov. 8, 1983

[54] METHOD FOR PROTECTING ENVIRONMENT FROM VOLATILE LIQUID CHLORIDE AS EXPOSED TO THE ATMOSPHERE

[76] Inventor: Hiroshi Ishizuka, 19-2, Ebara 6-chome, Shinagawa-ku, Tokyo, Japan

[21] Appl. No.: 373,875

[22] Filed: May 3, 1982

[30] Foreign Application Priority Data

May 13, 1981 [JP] Japan ................................. 56-71797

[51] Int. Cl.$^3$ ............................................. B05D 7/00
[52] U.S. Cl. .................................... 427/222; 422/40; 422/110; 422/122; 422/177; 422/900; 427/255.4; 427/400
[58] Field of Search ..................... 427/222, 255.4, 400; 422/900, 40, 110, 122, 177

[56] References Cited

U.S. PATENT DOCUMENTS 3,993,443 11/1976 Guenthner .......................... 422/900
4,117,178 9/1978 Pillar ................................... 427/222

Primary Examiner—Norman Morgenstern
Assistant Examiner—Janyce A. Bell
Attorney, Agent, or Firm—Fay & Sharpe

[57] ABSTRACT

A method for protecting environment from volatile liquid chloride as exposed to the atmosphere, which comprises:
  spreading foamy particulates of styrene resin over the chloride,
  initiating a reaction between the resin and chloride at the interface to form a filmy product, and
  covering the surface of the chloride to a substantial part with a layer comprising such product, thus blocking evaporation of the chloride to spread and contact with humidity in the atmosphere.

8 Claims, No Drawings

METHOD FOR PROTECTING ENVIRONMENT FROM VOLATILE LIQUID CHLORIDE AS EXPOSED TO THE ATMOSPHERE

The present invention relates to a method for protecting environment from volatile liquid chloride of metal, such as titanium tetrachloride or silicon tetrachloride, as accidentally exposed to the atmospheric air.

Among liquid chemicals utilized widely in current chemical and metallurgical industries, there are a lot of materials such as titanium tetrachloride and silicon tetrachloride which, as exposed to the atmosphere, are very harmful to human health, by evaporating to spread the chloride which in itself is corrosive and poisonous and, in addition, yields a more poisonous chemical, hydrochloric acid vapor, when it contacts to react with humidity (water) in the atmospheric air. Therefore, such chlorides must be handled with the greatest care available not to spill into the atmosphere, and any portion accidentally exposed to the air by spilling or otherwise, should be quickly halted and blocked against its contact with the atmosphere.

In case of such exposure, slaked lime is conventionally spreaded to cover the chloride on the surface so that the chloride may be neutralized and, at the same time, blocked from contact with the atmosphere. Since the lime, used as powder, only achieves rather a poor blockade from the air, while exhibiting a high density, a relatively thick layer, thus a large weight, of such material is necessarily moved to use with troubles before the chloride becomes harmless. Further the treatment has other drawbacks that with a chemical reaction with lime involved to a substantial part, the chloride cannot be recovered as an effective material, and that a thick dust rises when the lime powder is poured, so the fighters can hardly proceed with the work.

Therefore, the principal objective of the present invention is to provide a method, substantially eliminated of such drawbacks, for protecting environment in case of an accidental exposure of the chlorides.

The Inventor has found and based his invention on that the chloride such as titanium tetrachloride or silicon tetrachloride reacts with some kinds of resinous foam to efficiently polymerize, leaving a jellied layer of polymer at the interface so that an effective isolation is achieved between the chloride and atmosphere, and such filmy product is formed in an accelerated manner when any heat is supplied by reaction of chloride with atmospheric water to yield hydrochloric acid.

According to the invention there is essentially provided a method for protecting environment from volatile chloride liquid as exposed to the atmosphere, which comprises: spreading foamy particulates of styrene resin over the chloride, initiating a reaction between the resin and chloride at the interface to form a filmy product, and covering the surface of the chloride to a substantial part with a layer comprising such product, thus blocking evaporation of the chloride to spread and contact with humidity in the atmosphere.

The foamy particulates of resin, used in the invention as fume suppressive, essentially consist of styrene. Such tiny balls, each, may exhibit various sizes and apparent density: typically they are formed spheroidal having a diameter of about 3~4 mm and show a density of 0.02 to 0.014 g/cc.

Obviously, the fume suppressive particulates of the invention are also applicable to other liquid chemicals, as far as a similar layer is formed at the interface by polymerization.

The particulates may be stocked in various ways for provision against exposure of the chlorides in case of spilling or partial cracking of containers. For example, they can be stocked in a readily accessible bag or other containers provided close to chloride equipments, so that fighters readily can reach and pour them manually on the surface of exposed chloride; when the equipments are placed in a diked enclosure the particulates may be laid close to the ground in the area as uncovered or as put in a bag or like of a material readily breakable to open when in contact with the chloride so that the particulates when the chloride reaches may float and automatically spread over the surface; or they may be held in a stationary container-feeder which is placed close to the area and can be readily controlled manually from a remote place, or even automatically. Such provisions can be employed either singly or in combination with each other.

Since the layer at the interface in itself is water repellant and promoted to form by heat supplied by reaction of the chloride with water to reach, once such layer has been formed to cover the chloride to a substantial part, penetration of any water to reach the chloride will not cause any more fuming of the chloride itself or yielded hydrochloric acid.

In the invention environmental protection by fume suppression is best achieved when the layer as a whole consists of a jellied film; a close result can be obtained when the layer to a part comprises partly consumed or unconsumed particulates joined with adjacent ones and with the film, as the still air trapped in such particulates serves as an insulator.

Reaction between the resin and chloride slows down after the jellied films form to intervene, so that the latter can be recoverd to a substantial part as an effective material after the fume has subsided.

Since the particulates exhibit a by far lower density and thus dissolves in the liquid chloride to a very limited degree, the chloride can be recovered with a substantial improvement in both purification and volume to be scrapped.

EXAMPLE 1

Liquid titanium tetrachloride was tentatively spreaded over an approximately one squared meter of area open to an atmosphere of a relative humidity of 70%. 500 grams of foamy particulates having a diameter of about 3~4 mm was manually poured on the chloride to cover substantially the entire surface. In about ten seconds after the pouring, the chloride was covered with a jellied layer, and fume evolved no more when water was poured onto the covered chloride.

EXAMPLE 2

A titanium tetrachloride tank was used which was placed in an enclosure wide 2 m by 2 m, with a 50 cm high dike on the periphery. Up inside the area a funnel bottomed container-feeder was equipped which was loaded with spheroidal particulates having a diameter of about 3~4 mm of styrene resin, and remote controllable. Immediately after some 20 liters of liquid titanium tetrachloride was tentatively spilled in the enclosure, the container-feeder was opened from a distant panel to pour about 8 kg of the styrene particulates to spread over all the area. In 30 seconds the chloride was entirely covered with a jellied film. Thus treated, the chloride did not evolve any fume when water was poured thereon, 16 liters of chloride as recovered was available as an effective material.

As described above in detail, by utilizing as fume suppressive foamy particulates of a considerably lowered density and a high reactivity with the chlorides to yield a water or gas impermeable layer formed at the interface, the invention permits a substantially improved workability and security, so as to readily protect environment in any accidental exposure of the chloride, and also permits an effective return of the liquid material to the plant for a substantial part, as the recovery being contaminated to a very limited degree with the fume suppressive, due to the by far smaller density than that of the chloride.

I claim:

1. A method for protecting the environment from volatile liquid metal chloride exposed to the atmosphere, which comprises:
   spreading foamy particulates of styrene resin over the chloride, and
   permitting a reaction to occur between the resin and chloride at the interface to form a filmy reaction product which covers the surface of the chloride to a substantial degree, thus blocking evaporation of the chloride to prevent it from spreading and contacting the humidity in the atmosphere.

2. A method as recited in claim 1, in which said metal chloride is selected from the group consisting of titanium tetrachloride and silicon tetrachloride.

3. A method as recited in claim 1, in which said particulates generrlly are spheroidal and have a diameter of about 3 to 4 mm.

4. A method as recited in claim 1, in which said layer comprises consumed particulates.

5. A method for protecting the environment from uncontained volatile liquid metal chloride exposed to the atmosphere, which comprises:
   enclosing the chloride in a diked area,
   supplying from a source provided in close proximity to the diked area foamy particulates of styrene resin to spread over the chloride,
   permitting a reaction to occur between the resin and chloride at the interface to form a filmy product which covers the surface of the chloride to a substantial degree, thus blocking evaporation of the chloride to prevent it from spreading and contacting the humidity in the atmosphere, and
   recovering the chloride portion remaining unreacted.

6. A method as recited in claim 5, in which said source substantially consists of particulates stocked in a container which is readily breakable automatically on contact with the chloride.

7. A method as recited in claim 5, in which said chloride is selected from the group consisting of titanium tetrachloride and silicon tetrachloride.

8. A method as recited in claim 5, in which said particulates generally are spheroidal and have a diameter of from about 3 to 4 mm.

* * * * *